(12) United States Patent
Cook, III et al.

(10) Patent No.: US 10,968,758 B2
(45) Date of Patent: Apr. 6, 2021

(54) ATTACHMENT OF STRUCTURES HAVING DIFFERENT PHYSICAL CHARACTERISTICS

(71) Applicant: United Technologies Corporation, Farmington, CT (US)

(72) Inventors: Grant O. Cook, III, Spring, TX (US); James T. Roach, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 205 days.

(21) Appl. No.: 16/126,427

(22) Filed: Sep. 10, 2018

(65) Prior Publication Data

US 2020/0023452 A1   Jan. 23, 2020

Related U.S. Application Data

(62) Division of application No. 14/510,553, filed on Oct. 9, 2014, now Pat. No. 10,099,306.

(Continued)

(51) Int. Cl.
*F01D 5/30* (2006.01)
*B23K 1/00* (2006.01)
(Continued)

(52) U.S. Cl.
CPC .......... *F01D 5/3061* (2013.01); *B23K 1/0018* (2013.01); *B23K 1/19* (2013.01); *F01D 5/282* (2013.01); *F01D 5/3092* (2013.01); *F04D 29/322* (2013.01); *B23K 2101/001* (2018.08); *F02K 3/06* (2013.01); *F05D 2220/36* (2013.01); *F05D 2230/236* (2013.01); *F05D 2230/237* (2013.01); *F05D 2300/433* (2013.01); *F05D 2300/434* (2013.01); *F05D 2300/436* (2013.01); *F05D 2300/437* (2013.01);
(Continued)

(58) Field of Classification Search
None
See application file for complete search history.

(56) References Cited

U.S. PATENT DOCUMENTS 4,417,854 A * 11/1983 Cain ........................ F01D 5/284
                                                       416/219 R
4,610,934 A *  9/1986 Boecker ................ C04B 37/026
                                                       228/122.1

(Continued)

FOREIGN PATENT DOCUMENTS

WO    2014193512 A2   12/2014
WO    2015006438 A1    1/2015

OTHER PUBLICATIONS

European Search Report for European Application No. 15151647.3 dated Aug. 20, 2015, 3 pages.

*Primary Examiner* — Juan G Flores
(74) *Attorney, Agent, or Firm* — Cantor Colburn LLP

(57) ABSTRACT

A rotor assembly for a gas turbine engine is disclosed. The assembly includes: a composite fan blade, the fan blade including a root; a metallic rotor including a slot for receiving the root; the root being at least partially coated with a metal to form a metal-coated portion; the metal-coated portion of the root being at least partially covered with an intermediate material; and the root, metal-coated portion and intermediate material being received in the slot and bonded to the rotor.

8 Claims, 4 Drawing Sheets

Related U.S. Application Data

(60) Provisional application No. 61/930,510, filed on Jan. 23, 2014.

(51) Int. Cl.
  *B23K 1/19* (2006.01)
  *F01D 5/28* (2006.01)
  *F04D 29/32* (2006.01)
  B23K 101/00 (2006.01)
  F02K 3/06 (2006.01)

(52) U.S. Cl.
  CPC ...... *F05D 2300/44* (2013.01); *F05D 2300/48* (2013.01); *F05D 2300/50212* (2013.01)

(56) References Cited

U.S. PATENT DOCUMENTS

| | | |
|---|---|---|
| 9,527,777 B2 * | 12/2016 | Chamberlain ...... C04B 41/5155 |
| 2010/0135812 A1 | 6/2010 | Cairo et al. |
| 2011/0204205 A1 | 8/2011 | Kamel et al. |
| 2012/0082783 A1 * | 4/2012 | Barnett ................. B05D 3/102 |
| | | 427/142 |
| 2012/0210718 A1 | 8/2012 | Lacy et al. |
| 2013/0243604 A1 | 9/2013 | Roussille et al. |
| 2015/0050158 A1 | 2/2015 | Thomas et al. |

* cited by examiner

ATTACHMENT OF STRUCTURES HAVING DIFFERENT PHYSICAL CHARACTERISTICS

CROSS REFERENCE TO RELATED APPLICATIONS

This Application is a division of U.S. application Ser. No. 14/510,553 filed, Oct. 9, 2014, which claims the benefit of U.S. Provisional Application No. 61/930,510, filed Jan. 23, 2014, both of which are incorporated by reference in their entirety herein.

BACKGROUND

Technical Field

This disclosure relates to the bonding, attachment or coupling of structures having different physical characteristics, such as the bonding of a composite structure to a metallic structure. More specifically, this disclosure relates to turbomachinery, more particularly, to various means for bonding composite fan blades or vanes to metallic or composite rotors or hubs.

Description of the Related Art

Turbomachinery fan blades may be secured to a supporting rotor by providing shaped slots in the rotor that mateably receive correspondingly shaped roots of the fan blades. For example, the rotors may include dovetail or fir tree shaped slots that receive complementary shaped roots disposed at the radially inwardly ends of the fan blades. The slots of the rotor and the roots of the fan blades are adapted to lock the fan blades against radial movement as the rotor spins about its axis.

Designers of gas turbine engines are constantly seeking ways to reduce the weight of various components. One strategy involves the substitution of traditional titanium and aluminum alloys as primary construction materials in favor of various composite materials. Composites are attractive because they are typically lighter than titanium or aluminum alloys and exhibit high specific strength and stiffness. Polymer matrix composites may be used for many gas turbine engine parts despite their inability to withstand high temperatures. For example, carbon fiber reinforced polymer composites have been successfully used in the fabrication of fan blades. Metal matrix composites and ceramic matrix composites exhibit lower specific strengths, but show promise as they are able to withstand higher temperatures.

While the design and development of composite fan blades for gas turbine engines is under way, the rotors to which fan blades are attached are still primarily fabricated from metal alloys. However, the use of composite materials for rotors of fan assemblies is on the horizon. Regardless, because of different structural requirements, fan blades and rotors will most likely continue to be fabricated from different materials having different properties. In the case of a composite fan blade and a rotor, a problem arises because of the different material properties of the composite used to fabricate the fan blade and the metal alloy or composite material used to fabricate the rotor. When materials of different characteristics are coupled together, it may be difficult to provide robust attachment method because, amongst other reasons, differences in the coefficients of thermal expansion (CTEs) can compromise the connection between the fan blades and the rotor.

Thus, there is a need for improved techniques for bonding, coupling or attaching a composite structure, such as a composite fan blade, to a structure made from a different material, such as a metallic rotor or a composite rotor. While this disclosure utilizes fan blades and rotors as a primary example, this disclosure is directed more broadly to methods of bonding, coupling, or connecting one structure to another structure, wherein the structures are made from different materials having different material properties.

SUMMARY OF THE DISCLOSURE

In one aspect, a method of bonding a first structure to a second structure is disclosed. The first structure may be non-metallic. The method may include providing the first and second structures and coating a portion of the first structure with a metal to provide a metal-coated portion. The method may further include applying at least one intermediate material on the metal-coated portion of the first structure. Further, the method may include attaching the first structure to the second structure by bonding the intermediate material to the first and second structures.

In another aspect, a rotor assembly for a gas turbine engine is disclosed. The disclosed rotor assembly may include a composite fan blade. The fan blade may include a root. The metal rotor may include a slot for receiving the root. The root may be at least partially coated with a metal to form a metal-coated portion. The metal-coated portion of the root may be at least partially covered with an intermediate material. The root, the metal-coated portion and the intermediate material may be received in the slot and the intermediate material bonded to the root and the rotor to thereby attach the fan blade to the rotor.

In yet another aspect, a method of bonding a first structure to a second structure is disclosed. The method may include providing the first structure having a first CTE and providing the second structure having a second CTE, wherein the first and second CTEs are different. The method may further include selecting an intermediate material having a third CTE that falls between the first and second CTEs. The method may further include coating a portion of the first structure to provide a metal-coated portion and applying the intermediate material to the metal-coated portion of the first structure. Further, the method may include bonding the first structure to the intermediate material and the intermediate material to the second structure by liquid phase bonding.

In any one or more of the embodiments described above, the coating of the portion of the first structure may be performed by plating, metal spraying, impacting the portion of the first structure with a metallic material, applying a metal sleeve to the portion of the first structure, etc.

In any one or more of the embodiments described above, the bonding process may be selected from the group consisting of transient liquid phase (TLP) bonding, partial transient liquid phase (PTLP) bonding and brazing.

In any one or more of the embodiments described above, the second structure may be metallic.

In any one or more of the embodiments described above, the first and second structures are metallic and the bonding may include diffusing intermediate material into the first and second structures.

In any one or more of the embodiments described above, one of the structures may be composite and the other structure may be metallic, and the bonding may include reacting intermediate material with the metal coating on the composite structure and diffusing intermediate material into the metallic structure.

In any one or more of the embodiments described above, both structures may be made from composite materials and both structures may be partially coated with a metal. Further, the bonding may include reacting the intermediate material with the metal coatings on the composite materials of both structures.

In any one or more of the embodiments described above, the composite material may be selected from the group consisting of polyetherimide (PET), polyimide, polyether ether ketone (PEEK), polyether ketone ketone (PEKK), polysulfone, nylon, polyphenylsulfide, polyester, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, and silicones (thermoset). In a further refinement of this concept, the composite material may further include fiber reinforcements. In a further refinement, fiber reinforcements may be selected from the group consisting of carbon, glass, or metal fibers.

In any one or more of the embodiments described above, the first and second structures may have different coefficients of thermal expansion (CTEs) and the intermediate material may have a CTE that falls between the CTEs of the first and second structures.

In any one or more of the embodiments described above, the intermediate material may include a metal foil. However, the intermediate material or materials may also be provided in powder form, as a braze paste or the intermediate material may be applied by physical vapor deposition (PVD), electroplating and other techniques that will be apparent to those skilled in the art.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
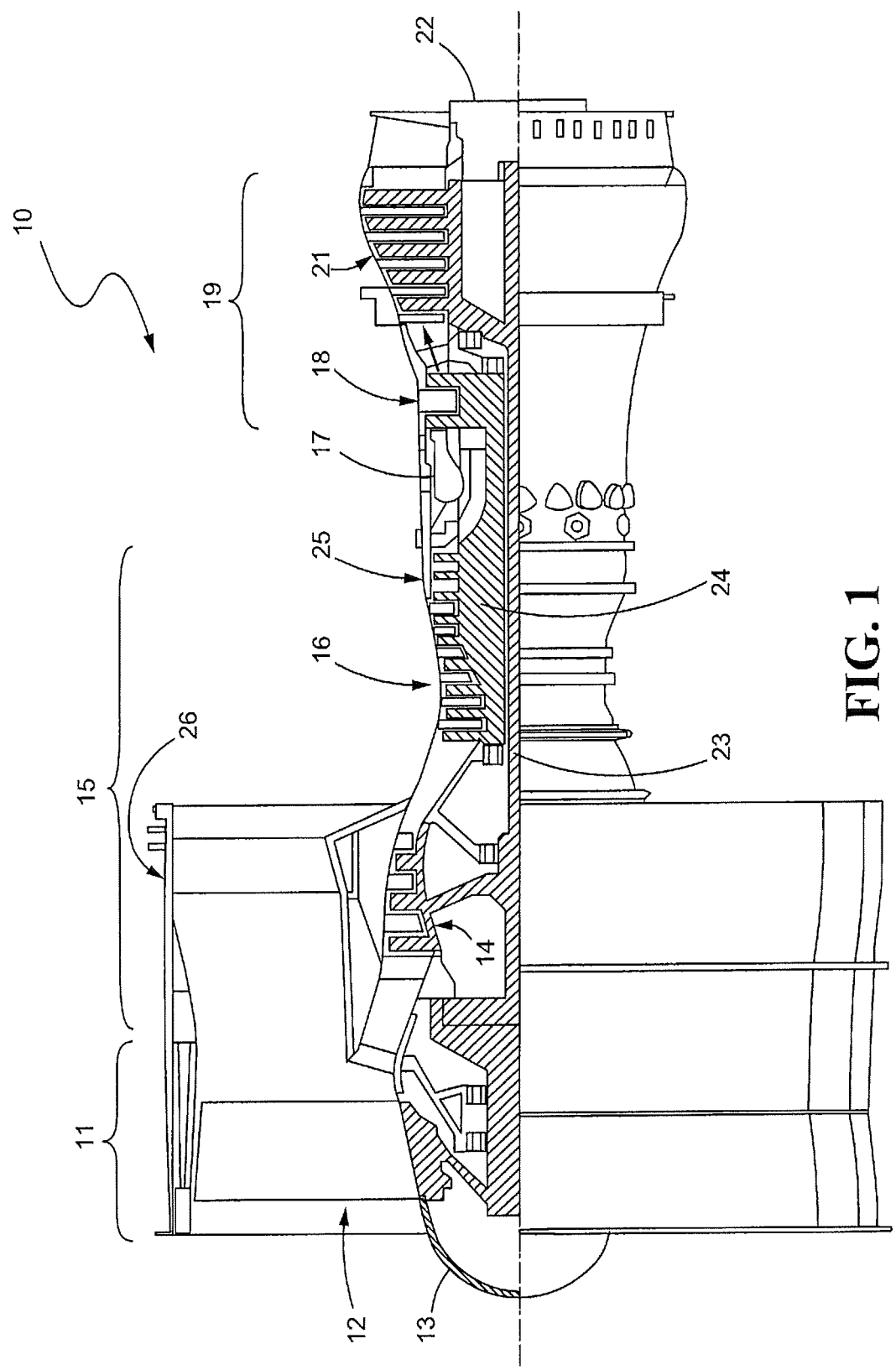
FIG. 1 is a sectional view of a gas turbine engine.

FIG. 1 is a sectional view of a gas turbine engine 10. The gas turbine engine 10 may include a fan section 11 that, in turn, may include a fan blade assembly 12. The fan blade assembly 12 may be mounted immediately aft of a nose 13 and immediately fore of a low-pressure compressor (LPC) 14. The LPC 14 may be part of a compressor section 15 and may be disposed between the fan blade assembly 12 and a high-pressure compressor (HPC) 16. The LPC 14 and HPC 16 may be disposed fore of a combustor 17, which may be disposed between the HPC 16 and a high-pressure turbine (HPT) 18 that is part of a turbine section 19. The HPT 18 is typically disposed between the combustor 17 and a low-pressure turbine (LPT) 21. The LPT 21 may be disposed fore of a nozzle 22. The LPC 14 may be coupled to the LPT 21 via a shaft 23, which may extend through an annular shaft 24 that may couple the HPC 16 to the HPT 18. An engine case 25 may be disposed within an outer nacelle 26 that surrounds the fan section 11.

Figure 2:
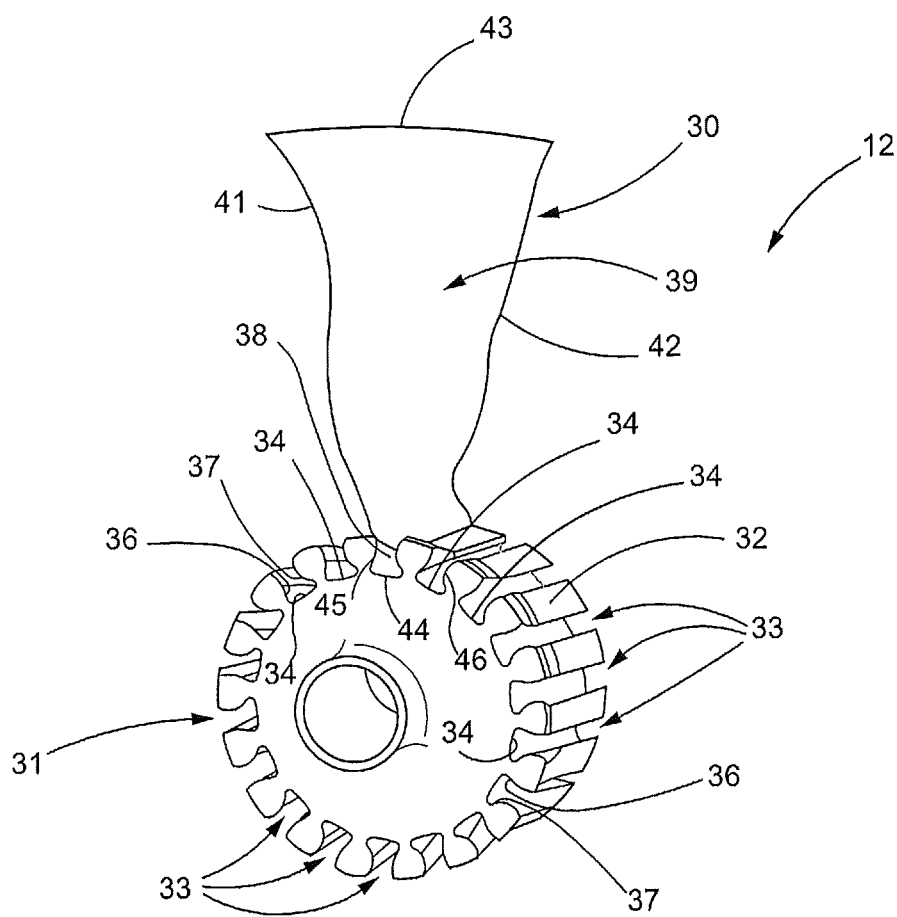
FIG. 2 is a perspective view of a rotor and fan blade that forms part of the fan assembly of the gas turbine engine illustrated in FIG. 1.

Turning to FIG. 2, the fan blade assembly 12 may include a plurality of fan blades 30 mounted to a rotor 31. More specifically, the rotor 31 may include an outer periphery 32 through which a plurality of dovetail shaped slots 33 extend. The slots 33 may include inner base surfaces 34. The base surfaces 34 may each be disposed between inwardly slanted sidewalls 36, 37 that extend inwardly towards each other as they extend radially outwardly from their respective base surfaces 34. As also shown in FIG. 2, the slots 33 may each accommodate a correspondingly shaped root 38 of a fan blade 30. The dovetail shaped root 38 may be connected to a blade or airfoil 39 that includes a leading edge 41 and a trailing edge 42. The leading and trailing edges 41, 42 are disposed on either side of the blade tip 43.

Still referring to FIG. 2, the root 38 may include an inner face 44 that may be disposed between and connected to inwardly slanted pressure faces 45, 46. The pressure faces 45, 46 may each engage the inwardly slanted sidewalls 36, 37 respectively of their respective slot 33 in the rotor 31. The pressure faces 45, 46 can wear due to their engagement with the slanted sidewalls 36, 37 of the rotor 31. The application of a metal layer 51 (FIG. 4) and an intermediate layer 52 (FIG. 5) to the pressure faces 45, 46 may enhance the wear resistance properties of the pressure faces 45, 46.

While dovetail shaped slots 33 and roots 38 are shown herein, the reader will note that other types of slots and roots, including but not limited to fir tree shaped slots and correspondingly shaped roots are also clearly applicable to this disclosure and are considered within the spirit and scope of this disclosure.

An exemplary substrate for use in fabricating all or part of the fan blades 30 includes an injection-molded, compression-molded, blow-molded, additively manufactured or a composite-layup piece formed of at least one of the following: polyetherimide (PEI), polyimide, polyether ether ketone (PEEK), polyether ketone ketone (PEKK), polysulfone, nylon, polyphenylsulfide, polyester, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), or any of the foregoing with fiber reinforcement of carbon, glass, metal, or other suitable fiber material.

Figures 3, 4, 5, 6:
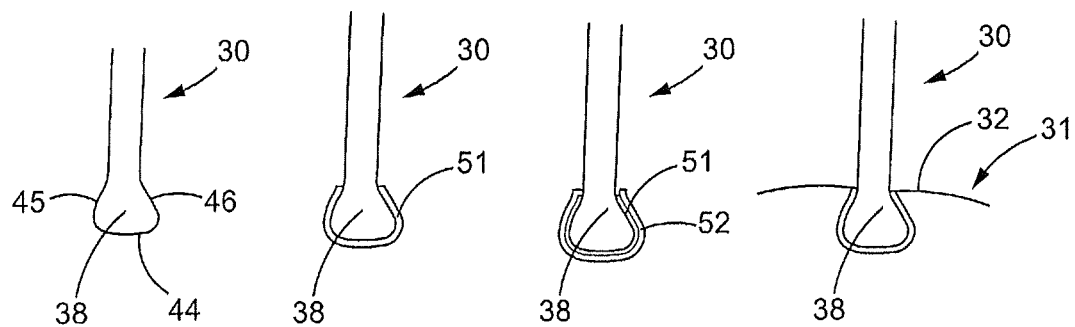
FIG. 3 is an end view of a fan blade root.
FIG. 4 is an end view of the fan blade root shown in FIG. 3 after being coated with metal.
FIG. 5 is an end view of the fan blade root shown in FIGS. 3 and 4 after an intermediate material has been applied to the metal-coated portion of the fan blade root.
FIG. 6 is a partial end of the fan blade root shown in FIG. 5 installed in a slot of a rotor and bonded to the rotor using one of the techniques disclosed herein.

Turning to FIGS. 3-7, FIG. 3 is an end view of a fan blade 30 that includes a root 38 with an inner face 44 and pressure faces 45, 46. In FIG. 4, the root 38 has been coated with a metal layer 51. If the fan blade 30 is fabricated from a composite material, plating or coating the composite root 38 with a metal enables another metal or metallic material to be bonded to the metal layer 51. Thus, in FIG. 5, the root 38 has not only been coated with the metal layer material 51 but a layer of intermediate material 52 has been applied to the metal layer 51. The intermediate material 52 may be provided in the form of foil, a powder or a braze paste. Foil may be preferred due to the ease of consistent application. Further, the intermediate material 52 may be a metallic material applied by PVD, electroplating or another process that will be apparent to those skilled in the art.

In the selection of the intermediate material 52, the CTEs of the intermediate material 52 and the materials of construction of the fan blades 30 and rotors 31 may be considered. For example, if the CTE of the composite material used to fabricate the fan blade 30 has a first value and the material used to fabricate the rotor 31 has a CTE of a second value that is different from the first value, the intermediate material 52 may be selected based on its CTE, which may be a third value that falls between the first and second values. The intermediate material 52 may also be selected for wear resistant properties.

Figure 7:
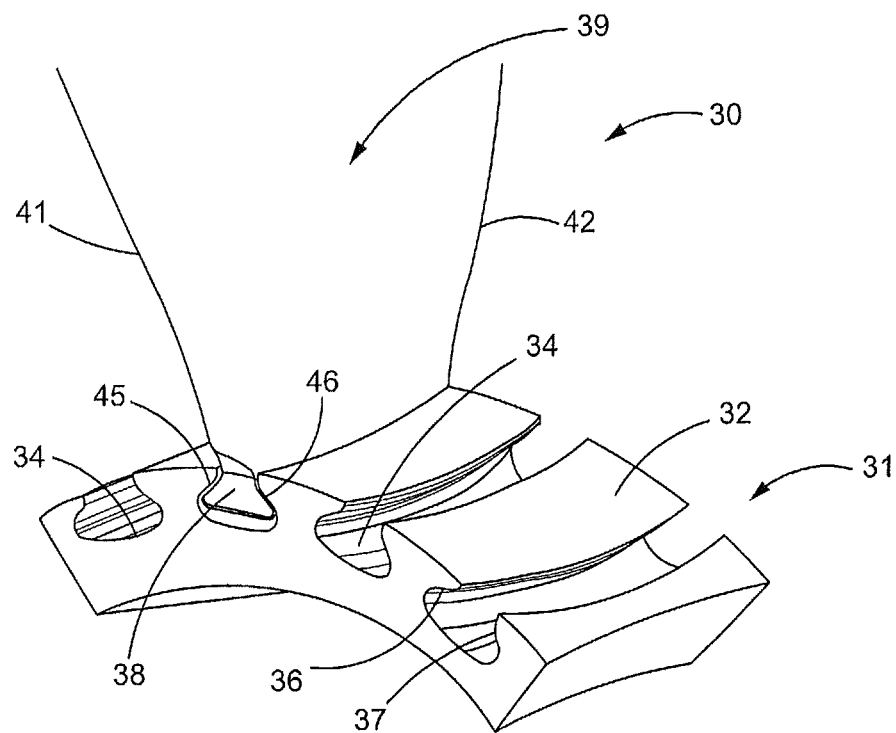
FIG. 7 is a partial perspective view of a fan blade installed on a rotor.

Turning to FIGS. 6 and 7, the fan blade 30 as illustrated in FIG. 5 has been inserted into the slot 33 and the rotor 31 and a bonding process has been carried out. The bonding process may be transient liquid phase (TLP) bonding, partial transient liquid phase (PTLP) bonding, brazing or another process that will be apparent to those skilled in the art. Because composite materials are less refractory than other non-metallic materials, such as ceramic materials, the bonding process illustrated in FIGS. 6 and 7 may need to be performed at lower temperatures. Thus, TLP and PTLP bonding may be preferred methods because they produced bonds that can be used at or above the actual bonding temperature.

In TLP and PTLP bonding, the intermediate material 52 diffuses into a metallic material and reacts with the metal coating on a composite material. Therefore, in an example where the fan blade 30 is fabricated from a composite material and the rotor 31 is metallic, the intermediate material 52 may react with the metal coating 51 on the composite root 38 and diffuse into the metallic rotor 31. Similarly, if the rotor 31 is fabricated from a composite material, the rotor 31 may be coated with a metal and the intermediate material 52 may react with the metal coating on the rotor 31 as opposed to diffusion. The application of a foil intermediate material 52, a powder intermediate material 52 or a braze paste intermediate material 52 to the root 38 is straightforward. Other intermediate materials may be applied by PVD, electroplating or other techniques that will be apparent to those skilled in the art.

Thus, the disclosed attachment methods can be used to join composite fan blades, airfoils or vanes to metallic or composite rotors or hubs while accounting for mismatches in the various CTEs of the two structures to be joined. Further, the disclosed methods enable an optimal selection of the material used to fabricate the first structure (fan blade, vane) independent of the optimal selection of the material used to fabricate the second structure (rotor, hub, etc.).

Figure 8:
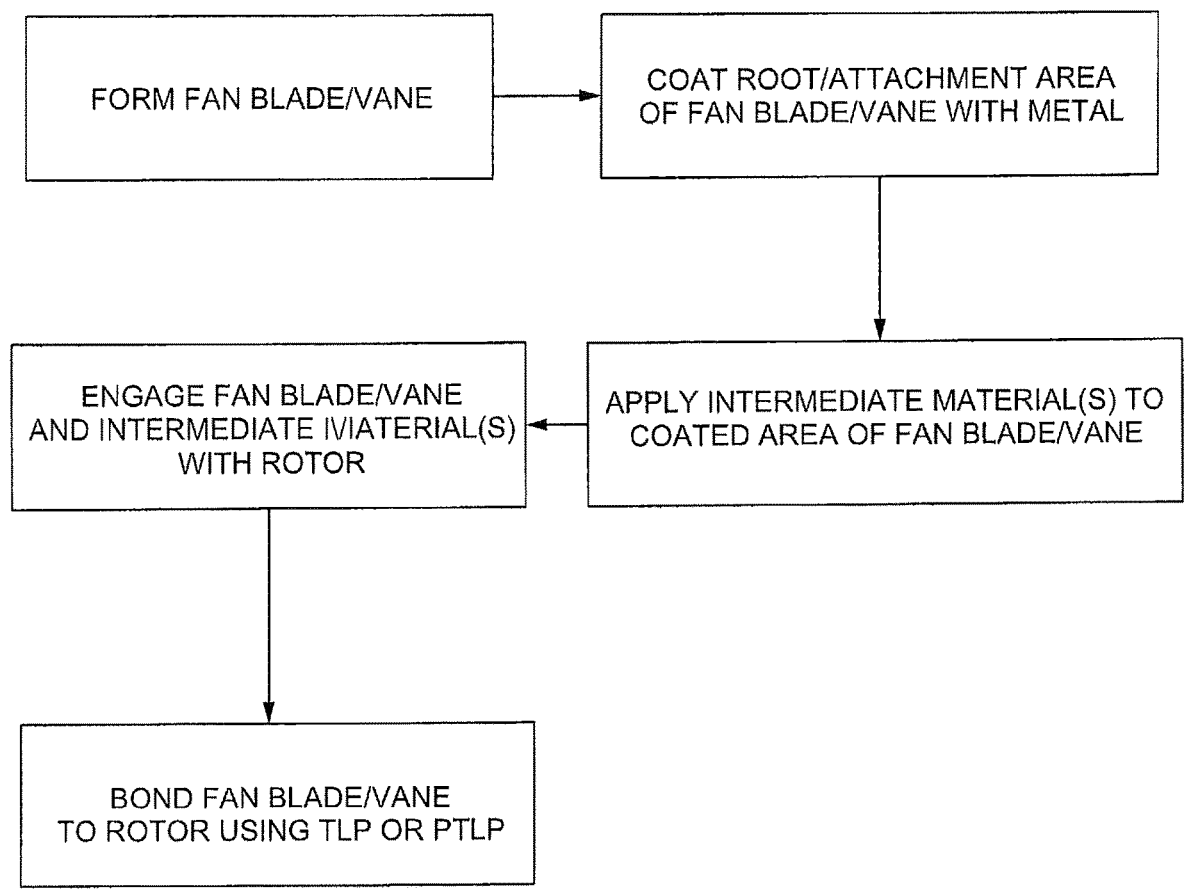
FIG. 8 is a flow chart depicting a sample sequence of steps which may be practiced in accordance with the present disclosure.

Turning to FIG. 8, a method of fabricating a fan assembly is illustrated. First, one or more fan blades 30 or vane may be formed from a composite material. The root 38 or the element that couples the fan blade 30 to a hub or rotor 31 may be coated or plated to form a metal-coated portion 51. A selected intermediate material 52 is applied to the metal-coated portion 51 on the fan blade or vane 30. Then, the fan blade or vane 30, with its metal-coated portion 51 and intermediate material 52 applied to the metal-coated portion 51 is then coupled to the rotor 31, typically by sliding the root 38, metal-coated portion 51 and intermediate material 52 into a slot provided in the rotor 31 for each fan blade or vane 30. Bonding is then carried out using TLP or PTLP bonding or brazing.

While only certain embodiments have been set forth, alternative embodiments and various modifications will be apparent from the above description to those skilled on the art. These and other alternatives are considered equivalents within the spirit and scope of this disclosure.

What is claimed:

1. A rotor assembly for a gas turbine engine, the assembly comprising:
    a composite fan blade, the fan blade including a root;
    a metallic rotor including a slot for receiving the root;
    the root being at least partially coated with a metal to form a metal-coated portion;
    the metal-coated portion of the root being at least partially covered with an intermediate material; and
    the root, metal-coated portion and intermediate material being received in the slot and bonded to the rotor.

2. The rotor assembly of claim 1 wherein the root, metal-coated portion, intermediate material and rotor are bonded using a process selected from the group consisting of transient liquid phase (TLP), partial transient liquid phase (PTLP) and brazing.

3. The rotor assembly of claim 1 wherein the composite fan blade is fabricated from a material selected from the group consisting of polyetherimide (PEI), polyimide, polyether ether ketone (PEEK), polyether ketone ketone (PEKK), polysulfone, nylon, polyphenylsulfide, polyester, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and any of the foregoing with fiber reinforcements.

4. The rotor assembly of claim 1 wherein the composite fan blade and the metallic rotor have different coefficients of thermal expansion (CTEs) and the intermediate material has a CTE that falls between the CTEs of the composite fan blade and the metallic rotor.

5. The rotor assembly of claim 1 wherein the intermediate material is a metal foil.

6. The rotor assembly of claim 1 wherein the intermediate material reacts with the metal-coated portion of the composite fan blade and diffuses into the metallic rotor.

7. The rotor assembly of claim 3 wherein the composite material further includes fiber reinforcements.

8. A method of bonding a first structure to a second structure, the method comprising:
    providing the first structure having a first coefficient of thermal expansion (CTE);
    providing the second structure having a second CTE, the first and second CTEs being different;
    selecting an intermediate material having a third CTE that falls between the first and second CTEs;
    coating a portion of the first structure to provide a metal-coated portion; applying the intermediate material to the metal-coated portion of the first structure;

and bonding the first structure to the intermediate material and the intermediate material to the second structure by liquid phase bonding.

\* \* \* \* \*